United States Patent [19]

Richardson

[11] Patent Number: 5,192,101

[45] Date of Patent: Mar. 9, 1993

[54] LOCK MECHANISM FOR AN AXLE LIFT SUSPENSION

[75] Inventor: Gregory A. Richardson, Holton, Mich.

[73] Assignee: Neway Corp., Muskegon, Mich.

[21] Appl. No.: 776,667

[22] Filed: Oct. 15, 1991

[51] Int. Cl.$^5$ .............................................. B60G 11/26
[52] U.S. Cl. .................... 280/704; 180/209; 280/711
[58] Field of Search .................. 280/81.1, 704, 711; 180/209

[56] References Cited

U.S. PATENT DOCUMENTS

| | | | |
|---|---|---|---|
| 3,831,210 | 8/1974 | Ow | 280/704 |
| 5,018,755 | 5/1991 | McNeilus et al. | 280/704 |
| 5,058,916 | 10/1991 | Hicks | 280/704 |
| 5,058,917 | 10/1991 | Richardson | 280/704 |

*Primary Examiner*—Kenneth R. Rice
*Attorney, Agent, or Firm*—Varnum, Riddering, Schmidt & Howlett

[57] ABSTRACT

A lock mechanism for an axle lift suspension comprises a support bracket mounted to the frame of a vehicle and a latch plate pivotably mounted to the support bracket. The latch plate has a hook portion and a cam portion and is manually rotatable against a spring bias. A pin is provided on a suspension arm, and when the arm is in a lifted position relative to the frame, the pin will be in nested engagement with the hook portion of the latch plate.

6 Claims, 9 Drawing Sheets

LOCK MECHANISM FOR AN AXLE LIFT SUSPENSION

BACKGROUND OF THE INVENTION

1. Field of the Invention

This invention relates to motor vehicle axle lift suspensions. More particularly, the invention relates to a lock mechanism for mechanically latching an axle in a lifted position.

2. Scope of the Prior Art

Several types of vehicles, including semitrailer truck vehicles and the like, have multiple sets of axle/wheel assemblies arranged in tandem so as to adequately support relatively heavy loads. To adjust the load provided by these tandem assemblies, it is known to employ suspension systems utilizing adjustably pressurized air springs and the like. It is sometimes desirable for various purposes to disengage one or more axle/wheel assemblies from ground contact. For example, when the vehicle is carrying a relatively light load, disengagement of the axle/wheel assembly will reduce tire wear. In some systems, such as a bimodal vehicle, wherein the vehicle can be adapted for both highway and railroad use, it is desirable to retract the highway axle/wheel assembly from ground contact to permit the introduction of a rail bogie for use in normal rail service. In either case, devices commonly referred to as axle lift mechanisms can be employed. For suspension systems that utilize air springs, an axle lift mechanism will typically lift the entire suspension.

Prior lift mechanisms employ a variety of devices to achieve disengagement. For example, stressed mechanical springs can be interposed directly between a vehicle frame and the axle. A chain and link mechanism can be employed such as that disclosed in U.S. Pat. No. 3,771,812, issued Nov. 13, 1973. Other lift mechanisms employ cams, levers, and springs such a those disclosed in U.S. Pat. No. 4,634,141, issued Jan. 6, 1987. Still other lift axle suspensions utilize air springs coupled with links such as the mechanism disclosed in U.S. Pat. No. 4,300,787, issued Nov. 17, 1981.

It has been found advantageous to provide an improved means for securing an axle/wheel assembly in a lifted position.

SUMMARY OF THE INVENTION

According to the invention, an improvement is provided in an axle lift suspension for a vehicle having a frame. The suspension includes an arm pivotably mounted to the frame, an axle mounted to the arm, and lifting means to selectively move the arm and the axle to and from the lifted position relative to the frame. In accordance with the invention, the improvement comprises a latch assembly mounted to the frame and adapted to automatically engage the arm when the arm is in the lifted position and restrain it from movement away from the lifted position.

Typically, the latch assembly comprises a support bracket mounted to the frame and a latch plate pivotably mounted to the support bracket for movement between a catch position and a reset position. Preferably, the support bracket will have an aperture, and a rod will extend through the aperture with a latch plate being fixedly mounted to the rod and thereby adapted for rotational movement about the longitudinal axis of the rod. The aperture may be elongated.

In one aspect of the invention, the arm has a pin, and the latch plate has a hook portion which is adapted to receive and retain the pin when the arm is in the lifted position. The latch assembly can further include a spring for biasing the latch plate toward the catch position so that the hook portion will retain the pin when the arm is in the lifted position.

Preferably, the rod has a handle so that the rod may be manually rotated in order to move the latch plate away from the catch position.

In another aspect of the invention, the latch plate has a cam portion spaced from the hook portion, with the cam portion being adapted to slidably move over the pin when the latch plate is rotated away from the catch position. Preferably, the cam portion has a flap which will engage the pin and retain the latch plate in the reset position.

In a further aspect of the invention, a lock mechanism is provided for an axle lift suspension mounted to a vehicle frame comprising a support bracket mounted to the frame and a latch plate pivotably mounted to the support bracket for movement between a catch position and a reset position so that when the arm is in the lifted position, the latch plate will automatically engage the arm and restrain the arm against movement away from the lifted position. Preferably, the latch plate is biased toward the catch position by a spring, and a stop is mounted to the support bracket to prevent movement of the latch plate beyond the catch position.

BRIEF DESCRIPTION OF THE DRAWINGS

The invention will now be described with reference to the following drawings in which.

DETAILED DESCRIPTION OF THE PREFERRED EMBODIMENT

Figure 1:
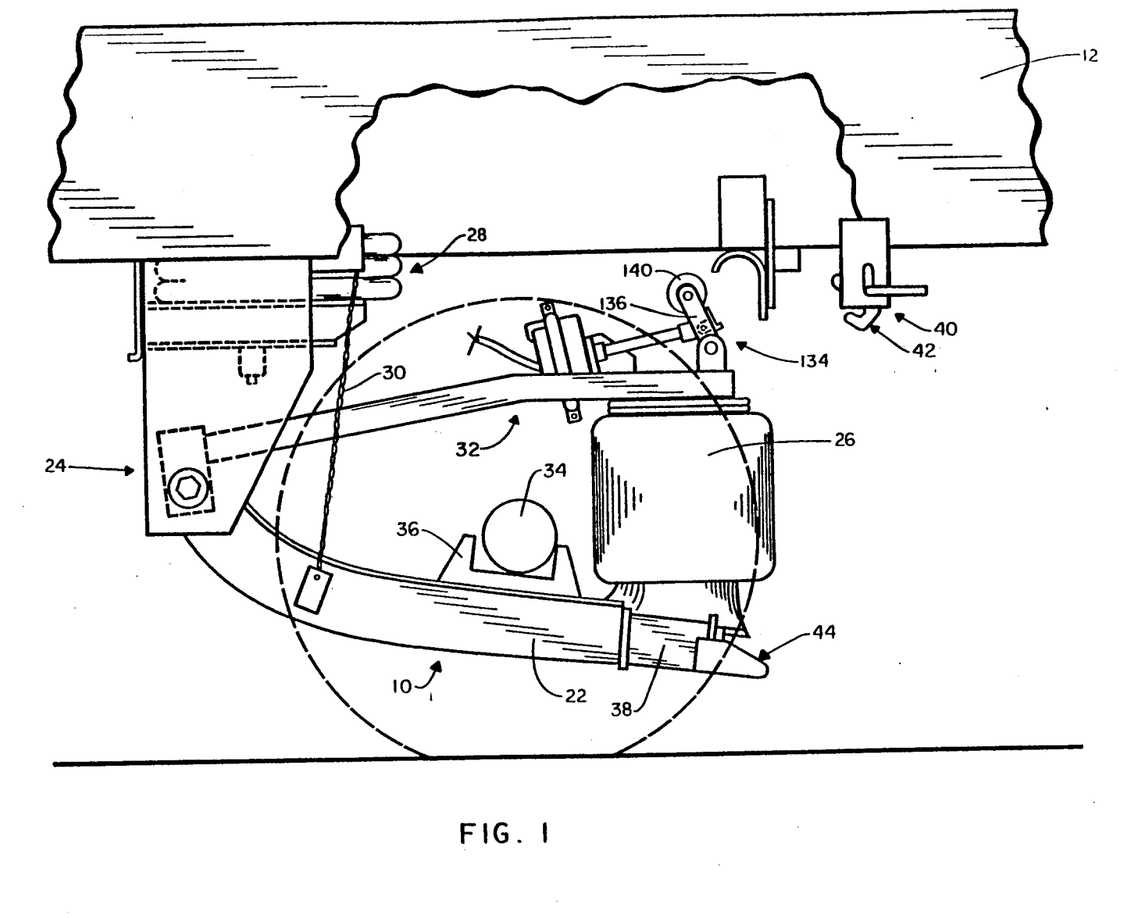
FIG. 1 is an elevational view of a vehicle axle lift suspension incorporating a lock mechanism according to the invention.

Referring now to FIG. 1, there is shown a two-stage retractable suspension system 10 which is particularly adapted for use with vehicles which can be alternately driven on highways or rails. It is to be understood that the invention is equally adaptable for use in any type of axle lift suspension such as those employed on vehicles solely for the purpose of disengaging an axle/wheel assembly from ground contact to reduce tire wear. The suspension 10 is mounted beneath a frame 12 and supports ground-engaging wheels 14. The suspension 10 is further adapted to be retractable whereby the wheels 14 may be lifted off of the ground surface 16. Further, the suspension 10 is extendable whereby the frame 12 may be lifted relative to the ground surface 16.

It will be understood that FIG. 1 illustrates a suspension 10 only one side of the vehicle, there being an identical suspension on the opposite side. Thus, the suspension 10 comprises a pair of trailing arms 22, also sometimes known as control arms, one mounted to each side of the frame 12 in generally parallel relation to each other. Each trailing arm 22 is pivotally mounted at a front end thereof to a frame bracket assembly 24. A pair of primary air springs 26 is disposed at a rearward portion of the trailing arms 22 so as to cushion the upward and downward movement of the frame 12 with respect to the ground-engaging wheels 14. A lift spring 28 having a chain link 30 extending to each trailing arm 22 serves to retract the trailing arms 22 and thus the suspension 10 relative to the frame 12.

It can be seen that in this embodiment, the frame 12 has a depth greater than that of a conventional vehicle frame. This increased depth permits the trailing arms 22 and the reels 14 carried thereby to be retracted further from the ground surface 16 than would ordinarily be permitted in a conventional vehicle. However, a swingable carriage 30 is provided intermediate the trailing arms 22 and the trailer frame 12 for supporting an upper portion of each primary air spring 26 so that conventional air springs may be used, while still permitting the greater movement of the trailing arms 22 and the wheels.

An axle 34 associated with the vehicle is fixedly secured to and substantially disposed between the opposed pair of trailing arms 22 by an axle connection 36. Also, a transverse beam 38 typically extends between the pair of trailing arms 22, each end of the transverse beam being connected to an end of the respective trailing arms 22 by a bushed connection. A brace mechanism 134 is provided to brace the carriage 32 in a position relative to the frame when the wheels 14 are in the ground-engaging position. When the brace mechanism 134 is disengaged, as illustrated in FIG. 1, the trailing arms 22 are free to be retracted when air is supplied to the lift spring 28.

A lock mechanism 40, in accordance with the invention, is provided for mechanically retaining the trailing arms 22 and the carriage 32 in the retracted position. The lock mechanism 40 comprises a latch assembly 42 mounted to the frame 12 and a striker assembly 44 mounted to an end of each trailing arm 22. A latch assembly 42 is disposed on each side of the vehicle for engagement with the striker assembly 44 associated with each respective trailing arm 22.

Figure 2:
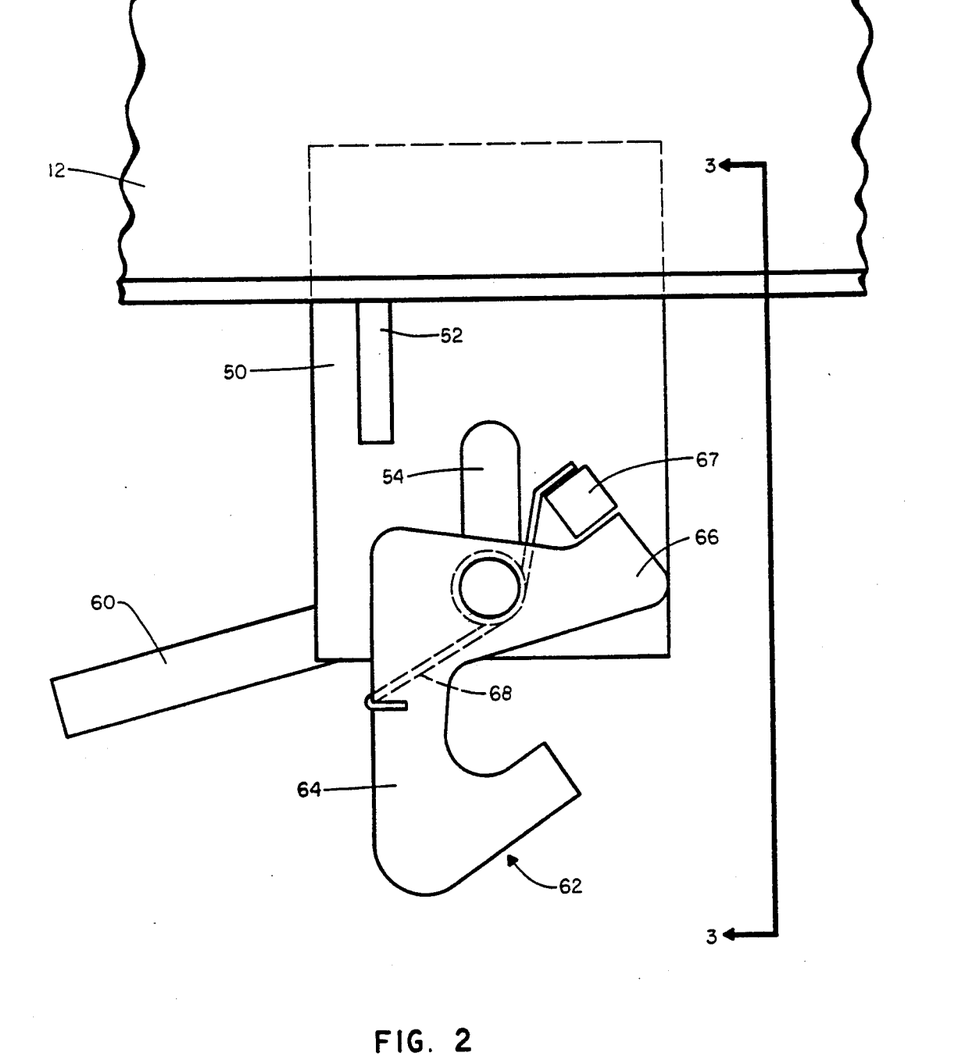
FIG. 2 is a detailed elevational view of the lock mechanism of FIG. 1.
Figure 3:
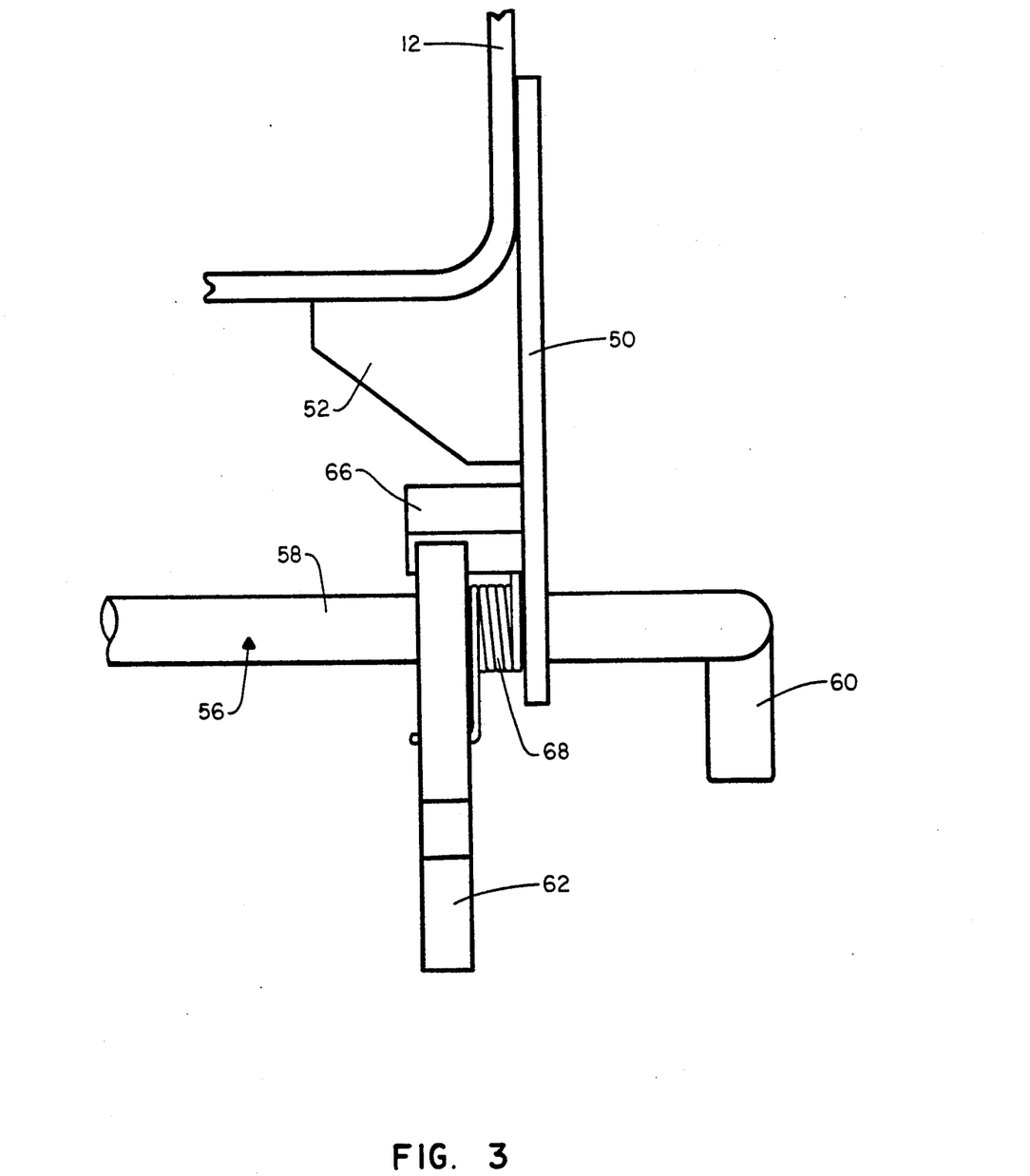
FIG. 3 is a front view of the lock mechanism taken along line 2—2 of FIG. 1.

Looking now at FIGS. 2 and 3, there is illustrated in detail the latch assembly 42 on the left side of the vehicle as one is looking toward the front of the vehicle indicated by the direction of the arrow A. A latch assembly 42 comprises a mounting bracket 50 which depends from the frame 12 and is rigidly secured thereto as by welding. The bracket 50 is strengthened by a gusset 52. An elongated slot 54 is provided in the bracket 50 through which a rod 56 projects. The rod 56 extends to the other side of the vehicle to be rotatably mounted to the latch assembly 42 on the right side of the vehicle. The rod 56 comprises a shaft portion 58 and a handle portion 60 extending from one end of the shaft 58.

The shaft 58 carries a latch plate 62 which is fixed to the shaft 58 and rotatable therewith. The latch plate 62 is thus substantially parallel with the bracket 50. The latch plate 62 includes a hook portion 64 which is adapted to catch and retain the striker assembly 44 when the suspension is retracted, and a cam portion 66 for a purpose to be described hereinafter. FIG. 2 illustrates the latch plate 62 in the catch position. A stop 67 extends from a surface of the mounting bracket 50 over an edge of the latch plate 62 to limit rotation of the latch plate relative to the vehicle beyond the catch position. Preferably, the latch plate 62 is biased by a spring 68 toward the catch position. The handle 60 preferably extends rearwardly from the shaft portion 58 to permit manual rotation of the rod 56 and the latch plate 62 for movement of the latch plate away from the catch position when the suspension is to be unlocked.

Figure 4:
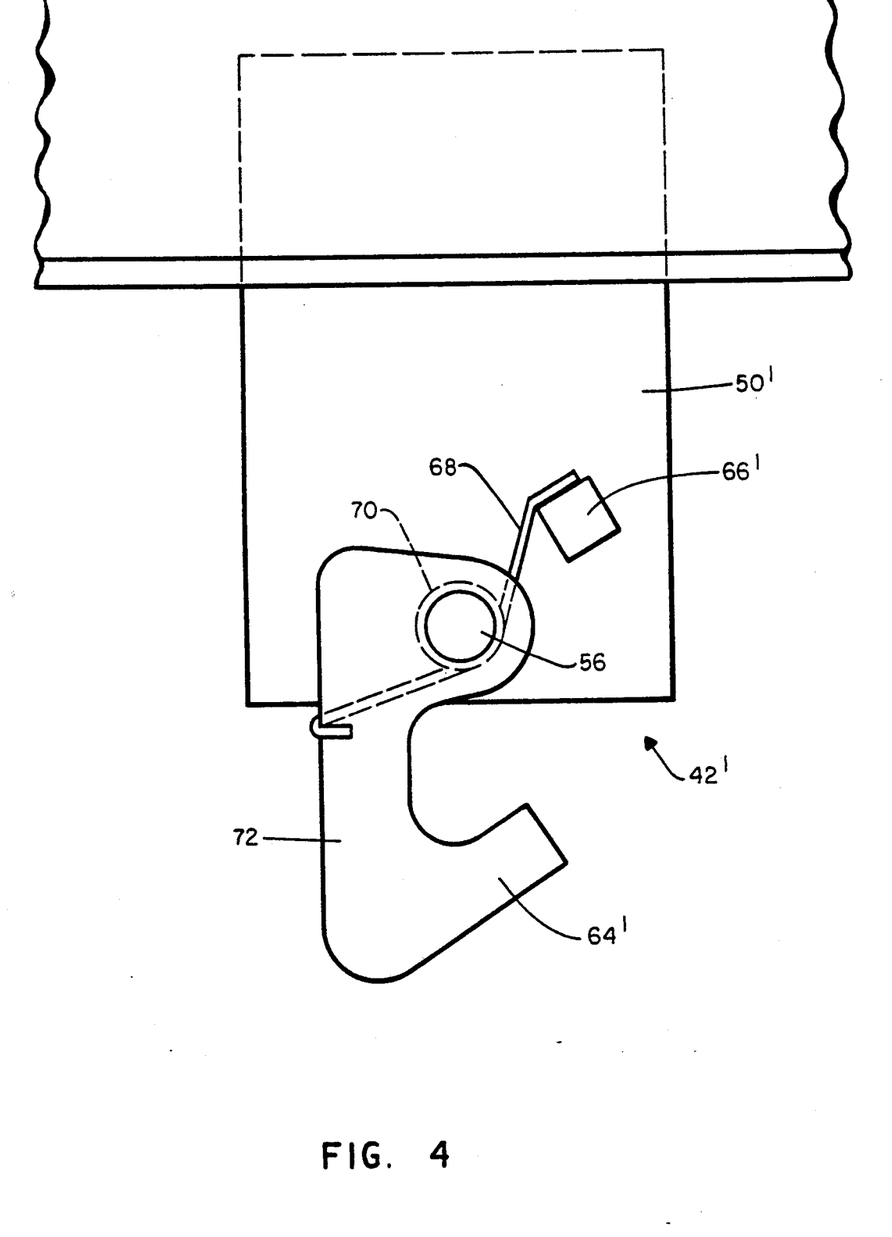
FIG. 4 is an elevational view of a lock mechanism on the other side of the vehicle.

Turning now to FIG. 4, the latch assembly 42 on the right side of the vehicle is of similar construction to the latch assembly on the left side of the vehicle illustrated in FIGS. 2 and 3. A mounting bracket 50 depends from the frame 12 and supports an end of the rod 56 for pivotal movement in an aperture 70. A latch plate 72 is fixed to the rod 56 for rotation therewith and includes a hook portion 64'. A spring 68' is disposed between a stop 66' and the latch plate 72 to bias the latch plate into the catch position. It can be seen that the latch assembly 42' differs from the latch assembly 42 of the left side of the vehicle in the following respects: the aperture 70 and the bracket 50' is not elongated, the latch plate 72 has no camming portion, and there is no handle portion 60 extending from the end of the rod 56.

Figure 5:
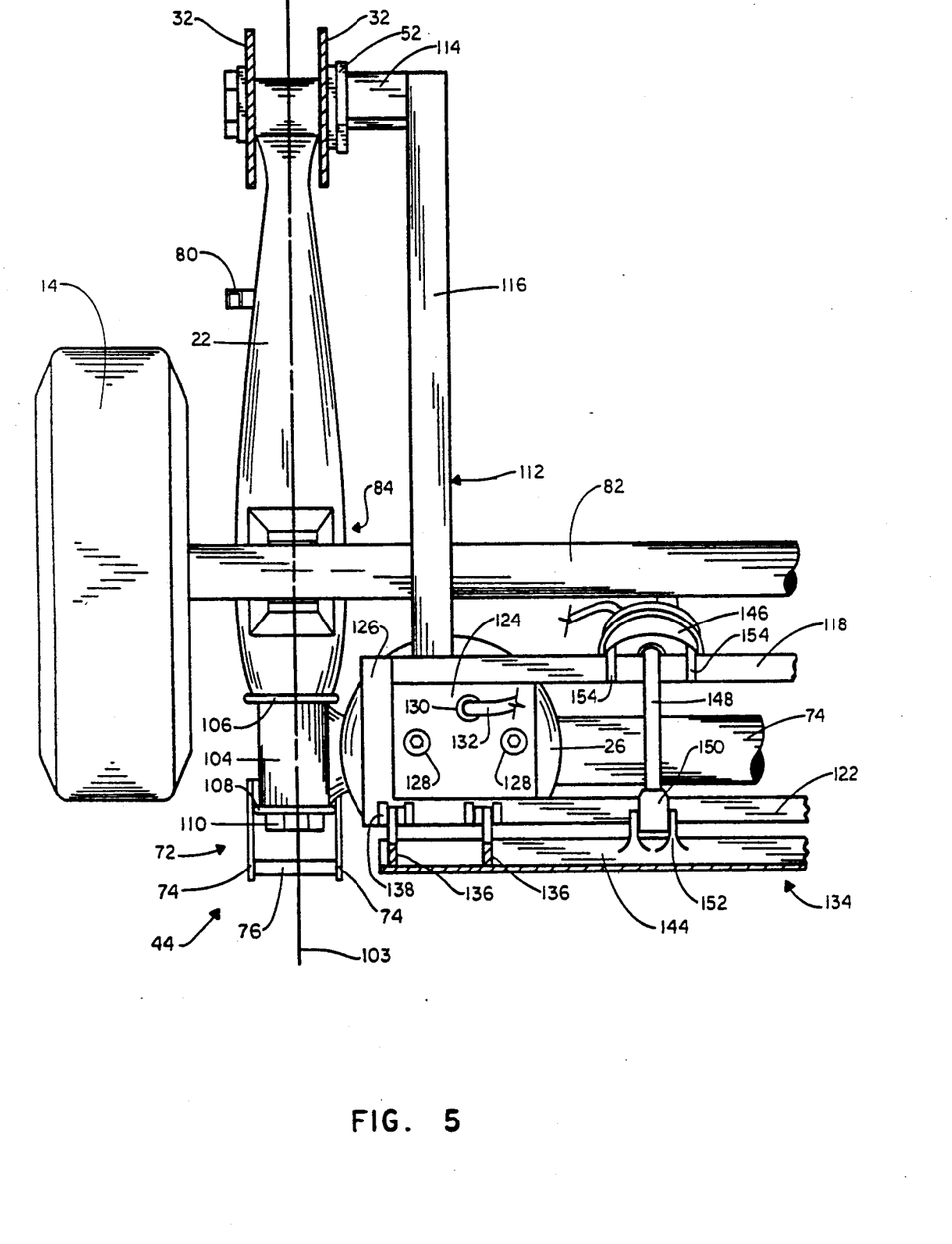
FIG. 5 is a plan view of a portion of the suspension of FIG. 1.

Turning now to FIG. 5, the striker assembly 44 can be seen extending from an end of the trailing arms 22. More particularly, the striker assembly 44 comprises a pair of spaced plates 74 extending rearwardly from the trailing arms 22. A pin 76 formed of a rod-shaped member is fixedly mounted to and between the plates 74.

Figure 6:
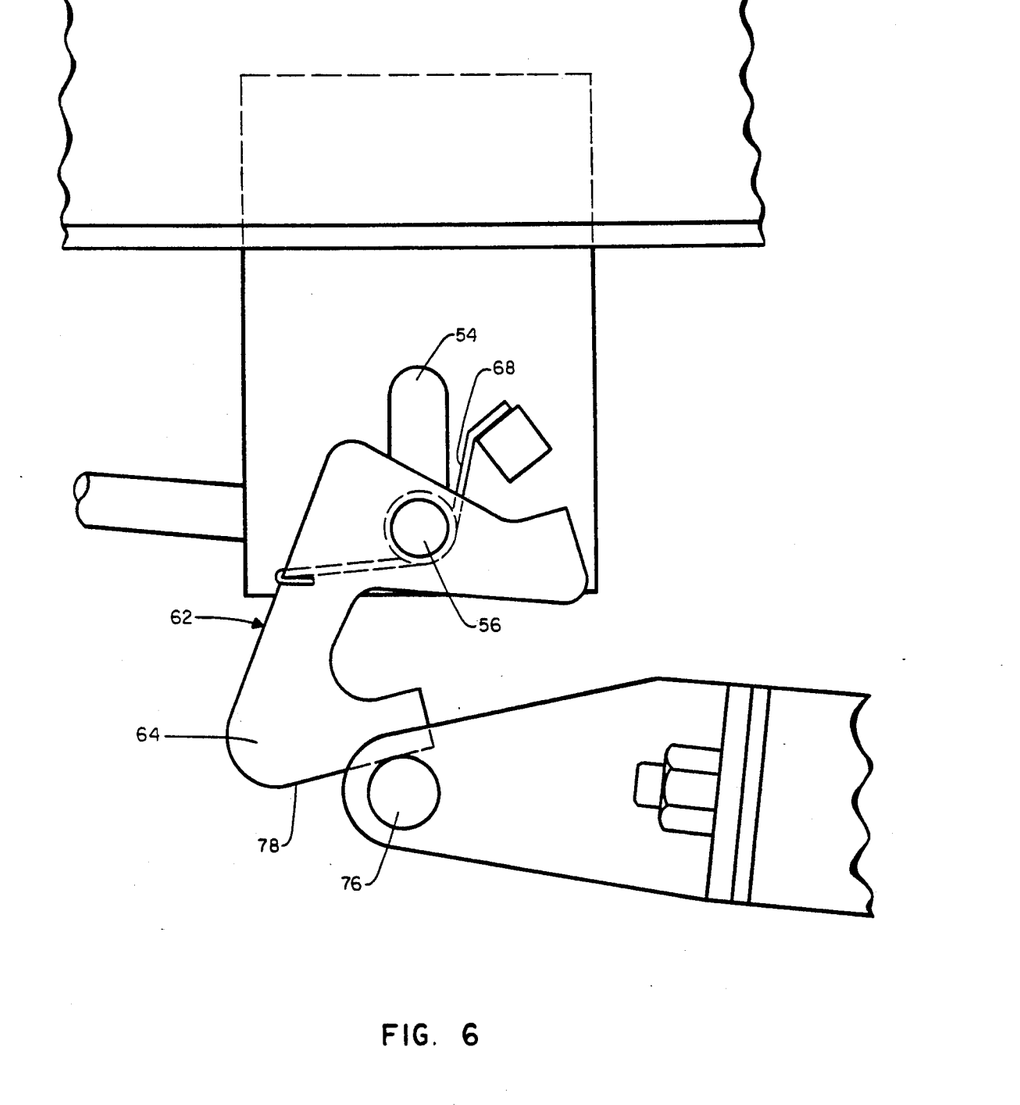
FIG. 6 is an elevational view similar to FIG. 2 with the striker being raised into the retracted position.

Operation of the lock mechanism is shown in FIGS. 6 through 9. In FIG. 6, as the trailing arm 22 is raised by energizing the axle lift mechanism, the pin 76 will eventually reach a point where it contacts an outside edge 78 of the hooked portion 64 of the latch plate 62. The edge 78 is sloped relative to the direction of travel of the pin 76 so that as the pin continues its upward travel, the latch plate 64 is caused to rotate in a counterclockwise direction as viewed in FIG. 6 about the longitudinal axis of the rod 56. This movement is against the bias of the spring 68.

Figure 7:
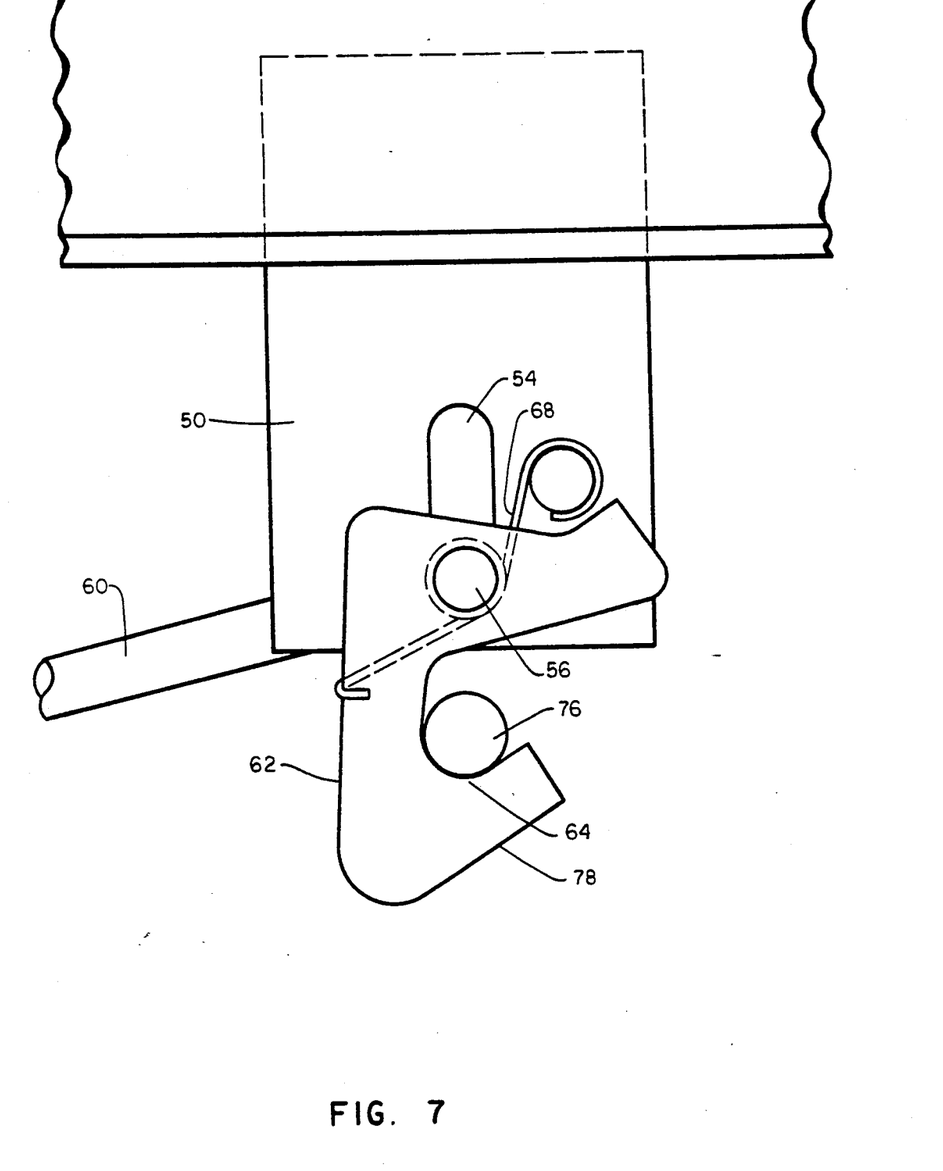
FIG. 7 is an elevational view similar to FIG. 2 with the striker and the suspension in the locked position.

In FIG. 7, the continued upward movement of the pin 76 along its arc of travel will eventually cause the latch plate 64 and the outside edge 78 of the hook portion thereof to move out of the line of travel of the pin, whereupon the spring bias will force the latch plate 62 to return to the catch position where the hook portion 64 will retain the pin 76 in nested engagement. In this position, downward movement of the pin 76 and thus the trailing arm 22 is inhibited by the presence of the latch plate 62, and the suspension 10 is effectively locked in a lifted or retracted position.

Figure 8:
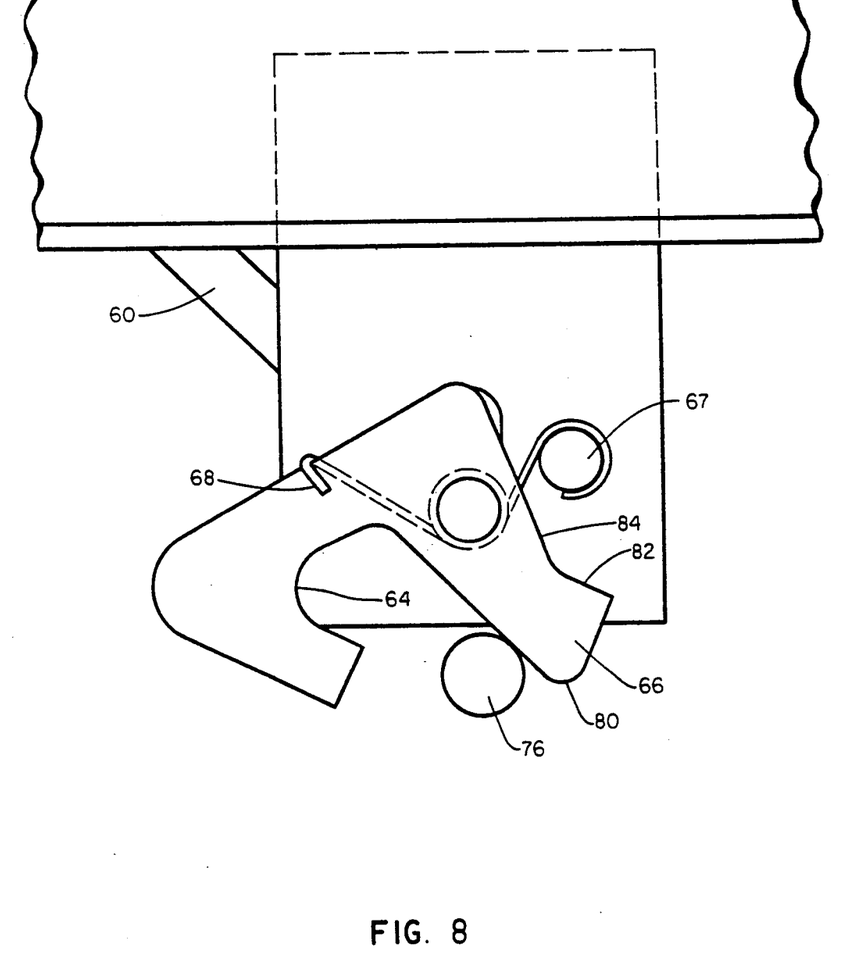
FIG. 8 is an elevational view similar to FIG. 2 with the handle being moved to the reset position.
Figure 9:
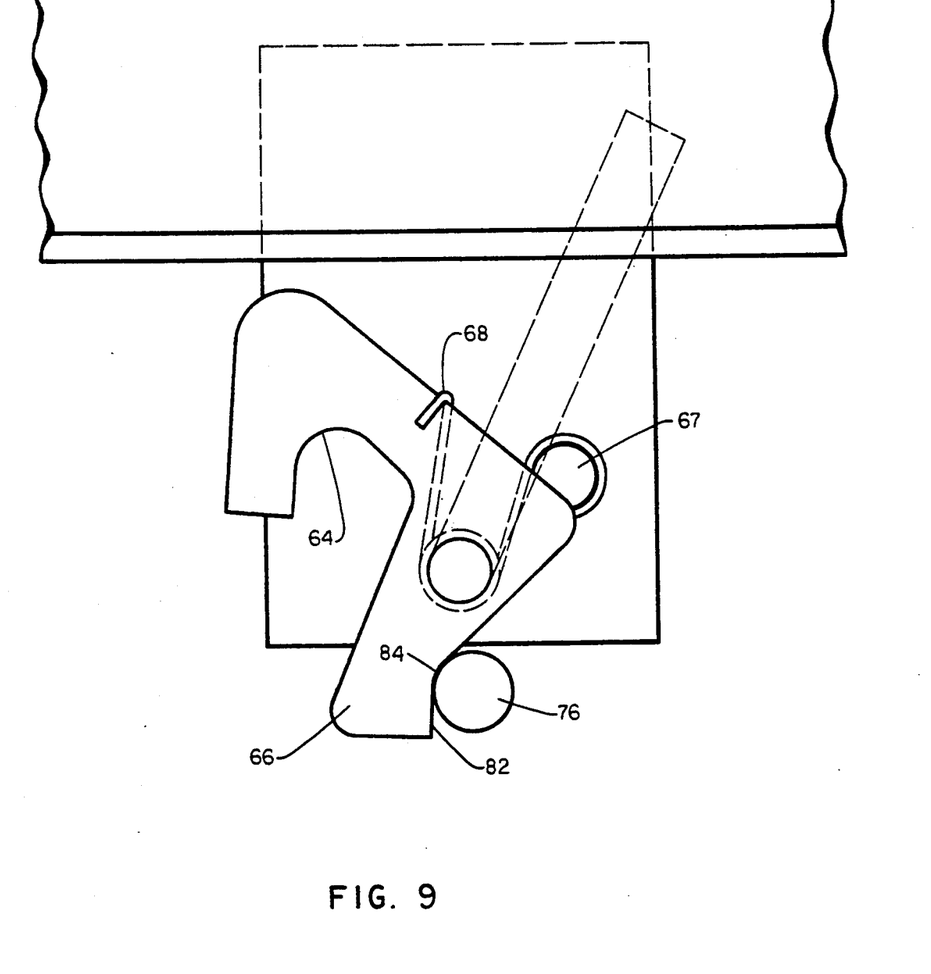
FIG. 9 is an elevational view similar to FIG. 2 with the handle in the reset position.

Looking now at FIG. 8, the lock mechanism 40 can be unlocked by engaging the axle lift mechanism to move the pin 76 as far up as it will go, and then manually moving the handle 60 to cause the rod 56 and the latch plate 62 to move in a counterclockwise direction, thereby disengaging the hook portion 64 from the pin 76. As the counterclockwise movement of the rod 56 is continued, the cam portion 66 of the latch plate 62 will come into contact with the pin 76. This contact point effectively acts as a fulcrum so that continued movement of the handle will force the rod 56 upwardly in the elongated slot 54. simultaneously, the first edge 80 of the cam section 66 will move tangentially relative to the pin 76 until a second edge 82 is adjacent the pin. At this point, the pin 76 will no longer interfere with downward movement of the latch, and the spring 68 will force the rod 56 downwardly in the elongated slot 54 until a third surface 84 of the cam section 66 bears against the pin 76. The latch assembly 42 is now in a reset position, as illustrated in FIG. 9, and the suspension is free to be lowered relative to the frame. As the suspension is lowered, and the pin 76 is moved downwardly away from the latch plate 62, the spring 68 will cause the latch plate to rotate clockwise to its original position where it will be ready to receive the pin in the next lift of the suspension.

It will be understood that the automatic resetting of the latch assembly 42 occurs only from the left side of the vehicle, the right side latch assembly 42' serving merely to capture its respective pin in the catch position and release it when the handle 60 is moved as hereinabove described. It will further be understood that reasonable variation and modifications of the disclosed structure are possible within the scope of the foregoing disclosure and drawings without departing from the spirit of the invention which is defined by the appended claims.

The embodiments of the invention in which an exclusive property or privilege is claimed are defined as follows:

1. An axle lift suspension apparatus for a vehicle having a frame, the apparatus comprising:
   an arm pivotably mounted to the frame;
   an axle adapted to carry a ground engaging wheel and mounted to the arm;
   lifting means to selectively move the arm and the axle to and from a lifted position relative to the frame; and
   a latch assembly mounted to the frame and adapted to automatically engage the arm when the arm is in the lifted position and restrain it from movement away from the lifted position, the latch assembly comprising a support bracket mounted to the frame, and a latch plate pivotably mounted to the support bracket for movement between a catch position and a reset position, the support bracket having an elongated aperture, and a rod extending through the aperture and mounted relative to the frame for rotational movement about its longitudinal axis, the latch plate being fixedly mounted to the rod.

2. An axle lift suspension apparatus for a vehicle having a frame, the apparatus including:
   an arm pivotably mounted to the frame;
   an axle adapted to carry a ground engaging wheel and mounted to the arm;
   lifting means to selectively move the arm and the axle to and from a lifted position relative to the frame;
   a latch assembly mounted to the frame and adapted to automatically engage the arm when the arm is in the lifted position and restrain it from movement away from the lifted position, the latch assembly comprising a support bracket mounted to the frame, and a latch plate pivotably mounted to the support bracket for movement between a catch position and a reset position, the support bracket having an aperture, and a rod extending through the aperture and adapted for rotational movement about its longitudinal axis, the latch plate being fixedly mounted to the rod, wherein the arm has a pin and the latch plate has a hook portion which is adapted to receive and retain the pin when the arm is in the lifted position;
   the latch assembly further comprising a spring for biasing the latch plate toward the catch position, the rod having a handle so that the rod may be manually rotated thereby moving the latch plate away from the catch position, and the latch plate having a cam portion spaced from the hook portion, said cam portion being adapted to slidably move over the pin when the latch plate is rotated away from the catch position.

3. An axle lift suspension according to claim 2 wherein the cam portion has a flat which will engage the pin and retain the latch plate in the reset position.

4. A lock mechanism for use with an axle lift suspension mounted to a vehicle frame, said suspension having an arm pivotably mounted to the frame, an axle mounted to the arm, and lifting means to selectively move the arm and the axle to and from a lifted position relative to the frame, the lock mechanism comprising:
   a support bracket and having elongated aperture mounted to the frames;
   a latch plate pivotably mounted to the support bracket for movement between a catch position and a reset position; and
   a rod extending through the aperture and is adapted for rotational movement about its longitudinal axis, the latch plate being fixedly mounted to the rod, whereby when the arm is in the lifted position, the latch plate will automatically engage the arm and restrain the arm against movement away from the lifted position.

5. A lock mechanism for use with an axle lift suspension mounted to a vehicle frame, said suspension having an arm pivotably mounted to the frame, said arm having a pin extending therefrom, an axle mounted to the arm, and lifting means to selectively move the arm and the axle to and from a lifted position relative to the frame, the lock mechanism comprising:
   a support bracket mounted to the frame and having an aperture;
   a latch plate pivotably mounted to the support bracket for movement between a catch position and a reset position, the latch plate having a hook portion which is adapted to receive and retain the pin when the arm is in the lifted position;
   a rod extending through the aperture and adapted from rotational movement about its longitudinal axis, the latch plate being fixedly mounted to the rod;
   the rod having a handle so that the rod may be manually rotated thereby moving the latch plate away from the catch position;
   the latch plate having a cam portion spaced from the hook portion, said cam portion being adapted to slidably move over the pin when the latch plate is rotated away from the catch position; and
   a spring for biasing the latch plate toward the catch position whereby the hook portion will retain the pin when the arm is in the lifted position whereby when the arm is in the lifted position, the latch plate will automatically engage the arm and restrain the arm against movement away from the lifted position.

6. A lock mechanism according to claim 5 wherein the cam portion has a flat which will engage the pin and retain the latch plate in the recessed position.

* * * * *